United States Patent [19]

Withers, Jr. L. Andrew et al.

[11] 4,432,526
[45] Feb. 21, 1984

[54] SUPPORT BLOCK ASSEMBLY

[75] Inventors: Withers, Jr. L. Andrew, 5801 Whispering Pines Cir., Mableton, Ga. 30059; William D. Withers; Carlo Fineo, both of Austell, Ga.

[73] Assignee: L. Andrew Withers, Jr., Mableton, Ga.

[21] Appl. No.: 336,671

[22] Filed: Jan. 4, 1982

[51] Int. Cl.³ ............................................. F16M 13/00
[52] U.S. Cl. ....................................... 248/542; 410/49
[58] Field of Search ........................ 410/99, 10, 49, 47, 410/50; 211/43; 188/36, 32; 248/542

[56] References Cited

U.S. PATENT DOCUMENTS

| | | | |
|---|---|---|---|
| 2,611,495 | 9/1952 | Weaver | 410/49 X |
| 3,380,695 | 4/1968 | Chambers | 410/49 |
| 3,438,340 | 4/1969 | Pendleton | 410/99 |
| 3,481,627 | 12/1969 | Felburn | 410/50 |
| 3,684,060 | 8/1972 | Waddle | 188/36 |
| 4,102,274 | 7/1978 | Feary | 410/50 |
| 4,106,735 | 8/1978 | Partain et al. | 248/119 |

Primary Examiner—J. Franklin Foss
Attorney, Agent, or Firm—Thomas & Kennedy

[57] ABSTRACT

A pair of support blocks of similar construction are connected together by a flexible strap extending therebetween. Each support block includes a platform for engaging a floor surface and a support plate positioned on the platform, and an end portion of the strap extends between the support plate and the platform of each support block. The support plate of each of the support blocks is hingedly connected to its platform and includes an upwardly facing support surface sloped downwardly toward the opposite support block whereby a cylindrical roll or the like can be placed on and supported by the support blocks, with the support blocks forming wedges on opposite sides of the cylindrical roll.

8 Claims, 4 Drawing Figures

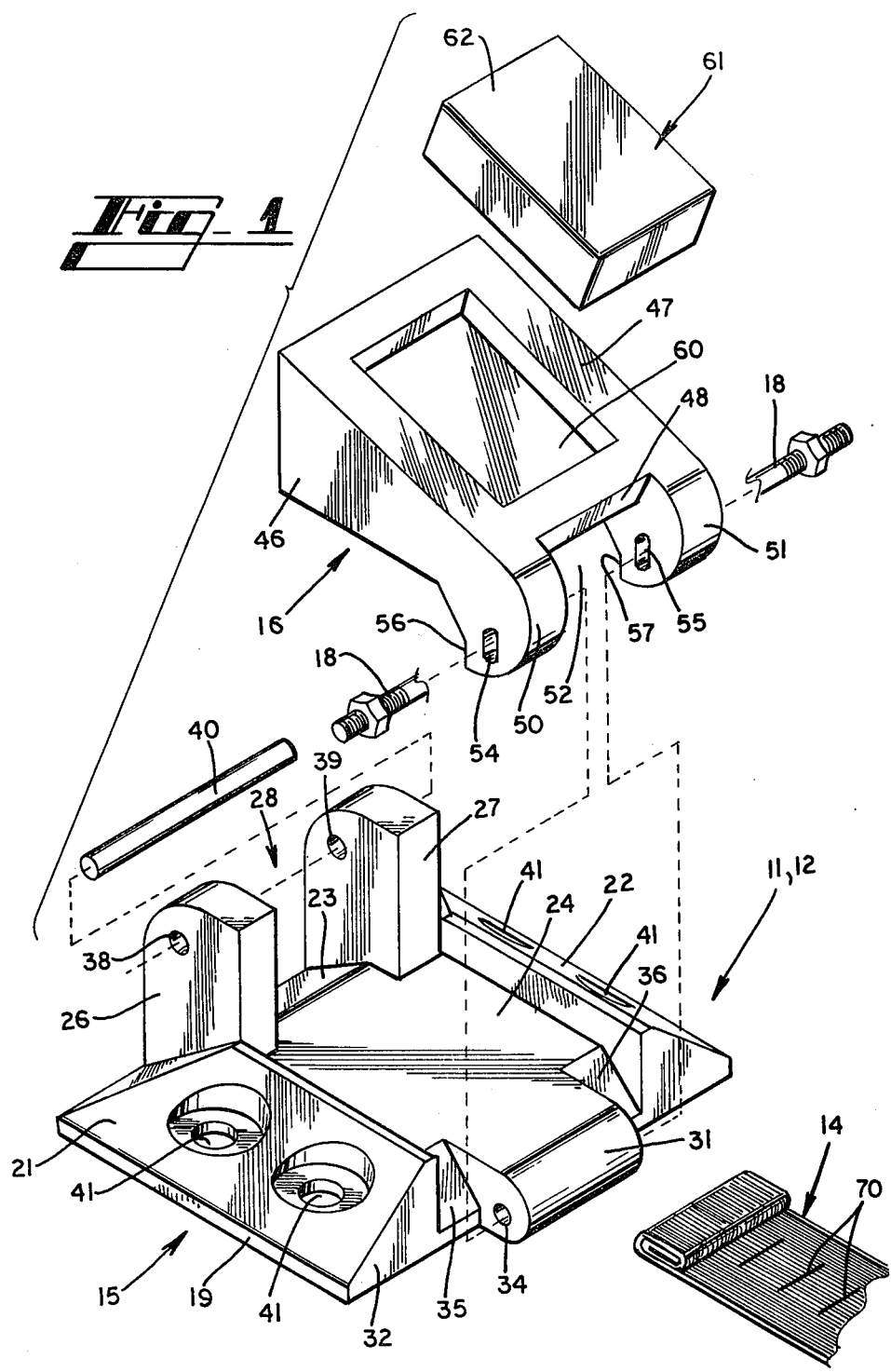

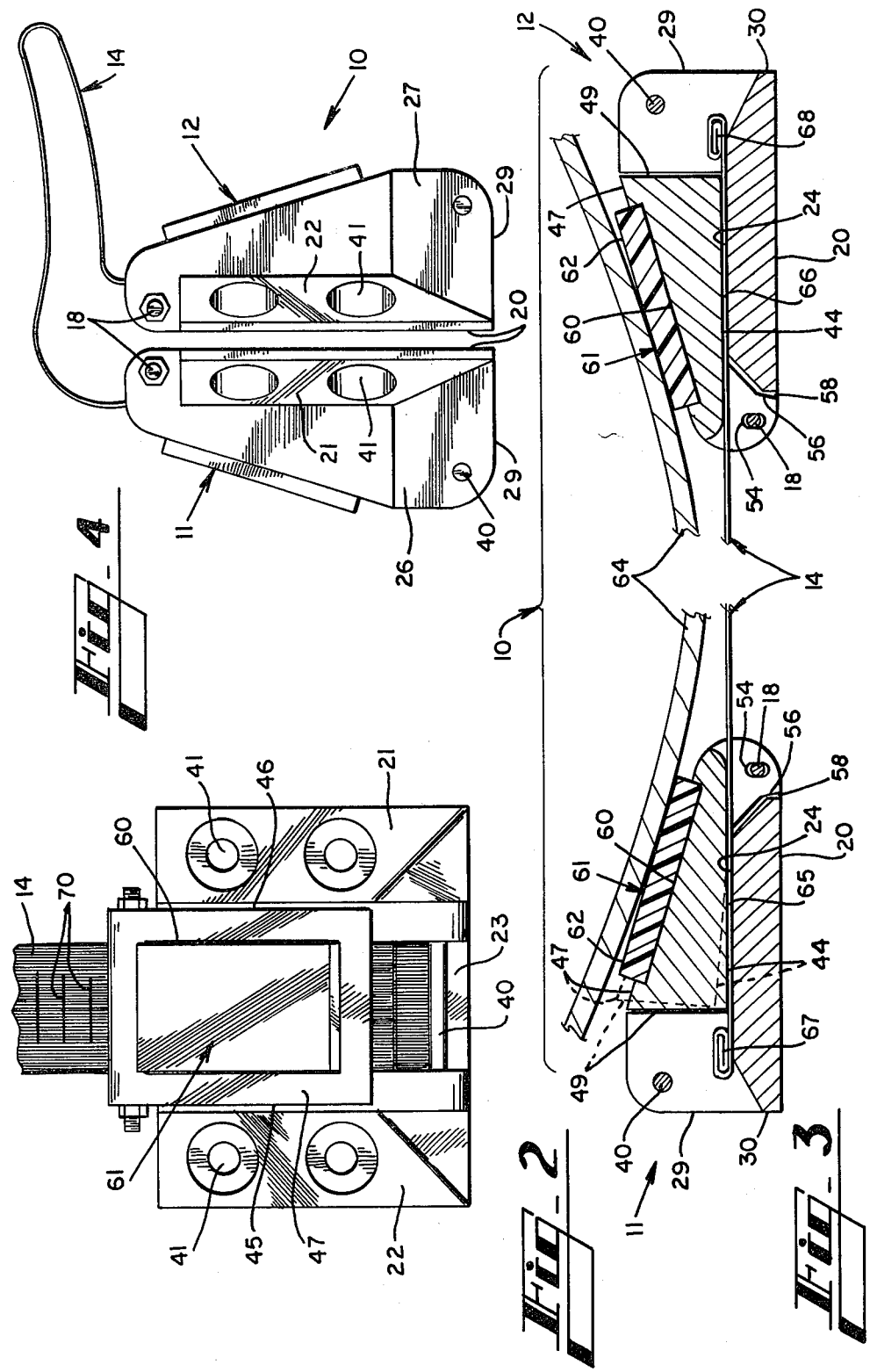

4,432,526

SUPPORT BLOCK ASSEMBLY

BACKGROUND OF THE INVENTION

This invention relates to a support block assembly for use in supporting large and heavy cylindrical rolls and similar shapes, to prevent the rolls from engaging and rolling on a floor surface.

Very large and heavy rotatable cylindrical rolls are used as part of the equipment for manufacturing paper in paper mills. After the rolls have been used in the paper making process their cylindrical surfaces become uneven due to wear of the cylindrical surfaces and due to particles of the paper material adhering to the cylindrical surfaces. The rolls must be removed from the related equipment and the outside cylindrical surfaces of the cylindrical rolls must be ground or otherwise refinished so as to remove imperfections in the faces of the rolls and the associated bearings and other elements replaced and repaired. Most paper mills have spare rolls which are new or which have been refinished and which are stored for future use. Occasionally, the spare rolls which are worth several hundred thousand dollars each which have been refinished and are ready for use are stored on old wooden blocks or other relatively soft materials, so as to avoid having the finished rolls engage the floor surface or inadvertently roll across a floor surface. The items used to support the spare rolls usually are unreliable in that when a roll is being placed on a support item, the weight and shape of the roll may cause the support item to slide out of position or the roll may tend to roll off of the support item. Additionally, in order to support a single roll, it is desirable to have supports at each end of the roll, with the supports being of similar size and shape so that the roll is supported in a horizontal attitude, without one end being positioned higher or lower than the other end.

In some instances, the replacement rolls for a paper mill are of different sizes, requiring different types of supports to properly store the rolls. Thus, there are times when the proper size and shape of roll supports are not available to support a roll, and the mill personnel must improvise by using wrong size supports, etc., or by placing a roll directly on the floor surface.

SUMMARY OF THE INVENTION

Briefly described, the present invention comprises a support block assembly for supporting large cylindrical rolls and other cylindrical shapes, which includes a pair of wedge-shaped support blocks of similar construction, each of which is connected to the other by an intermediate flexible strap. Each support block includes a platform for engaging a floor surface and a support plate positioned on the platform. The end portions of the strap extend between the platform and its support plate of each support block, and the support plate of each support block is hingedly mounted to the platform at a position adjacent the opposite support block. The strap includes dimension markings thereon so that the distance between the support blocks can be visually calculated by observing the indicators exposed on the support strap between the support blocks.

Each of the support blocks of the support block assembly includes ears located at the end portion thereof away from the hinge connection between the platform and the support plate, and the ears include surfaces that are oriented substantially at a right angle with respect to the bottom surface of the platform, so that the support blocks of the support block assembly can be lifted by grasping the strap intermediate its ends, whereupon the support blocks will be suspended by the support strap with their flat bottom surfaces in juxtaposition, and the support block assembly can be lowered to a floor surface and the support blocks will rest on their ears with their bottom surfaces juxtaposed.

When the support block assembly is spread flat on a floor surface for receiving a cylindrical roll, the weight of the cylindrical roll is applied to the support plate, and that weight is applied to the strap and to the platform, causing the weight of the roll to clamp the support block and platform against the strap, thus preventing the strap from sliding through either of the support blocks.

Thus, it is an object of this invention to provide a support block assembly for large and heavy cylindrical rolls and similar shapes which is expedient to use, which reliably and safely holds the cylindrical roll away from a floor surface, and which can be adjusted to accommodate cylindrical rolls of different size.

Another object of this invention is to provide a support block assembly for supporting cylindrical rolls and the like which is adjustable for a wide variety of roll diameters, which can be conveniently hand carried from one location to another, and which is convenient to store when not in use without the hazard of one support block of a pair being separated from the other support block.

Another object of this invention is to provide a support block assembly for cylindrical rolls and the like which provides a reliable support surface for supporting cylindrical rolls, and which is durable and easy to manipulate.

Other objects, features and advantages of the present invention will become apparent upon reading the following specifications, when taken in conjunction with the accompanying drawings.

BRIEF DESCRIPTION OF THE DRAWINGS

FIG. 1 is an exploded perspective illustration of one of the support blocks of the support block assembly.

FIG. 2 is a plan view of one of the support blocks of the support block assembly.

FIG. 3 is a side cross-sectional view of the support block assembly, with a portion of the strap broken away, and showing portions of the cylindrical roll supported by the support block assembly.

FIG. 4 is a side elevational view of the support block assembly, with the support blocks illustrated in their storage positions.

DETAILED DESCRIPTION

Referring now in more detail to the drawings, in which like numerals indicate like parts throughout the several views, FIG. 3 illustrates the support block assembly 10 which comprises a pair of support blocks 11 and 12 and an intermediate strap 14.

As best illustrated in FIG. 1, each support block 11, 12 includes a platform 15 and a support plate 16 which are hingedly connected together by pin 18. Platform 15 includes a base 19 having a flat bottom surface 20 (FIGS. 3 and 4) for engagement with a floor surface or the like, sloped side flanges 21 and 22, sloped end surface 23, and platform surface 24 positioned intermediate the sloped side flanges 21 and 22. Platform surface 24 is parallel to the flat bottom surface 20 and is recessed below the upper surfaces of the side flanges 21 and 22. Upstanding ears 26 and 27 protrude upwardly from the sloped end surface 23 and form a gap 28 therebetween for the passage of strap 14. The end surfaces 29 of the upstanding ears 26 and 27 are perpendicular to the flat bottom surface 20 of platform 15, and are coextensive with the edge 30 of the platform (FIG. 3). Boss 31 protrudes from the front edge 32 of platform 15 and includes hinge pin opening 34 which extends therethrough. The front edge 32 of platform 15 is bevelled at 35 and 36. Handle openings 38 and 39 are formed coaxially through upstanding ears 26 and 27, respectively, and are located near the upper portions of the ears. Handle 40 is inserted through the openings 38 and 39 and functions as a convenient means for manipulating the support block 11, 12.

Counter bored openings 41 are located in the side edges of platform 15 so that screws can be inserted through the openings 41 and screwed into a floor surface, or the like to anchor the platform. Anchoring of the platform may be desirable when the platform is to be mounted on a flatbed truck, or other movable surface.

Support plate 16 is mounted on platform 15 and is approximately wedge-shaped. Support plate 16 includes a substantially flat bottom surface 44 (FIG. 3), side surfaces 45 and 46, top surface 47, front hinge surface 48 and rear surface 49. Hinge bosses 50 and 51 extend beyond the front hinge surface 48 and below bottom surface 44 and form a gap 52 therebetween which is approximately the same as the gap 28 between the upstanding ears 26 and 27 of platform 15. Hinge bosses 50 and 51 include hinge pin openings 54 and 55 which are coaxially aligned. The hinge pin openings 54 and 55 are aligned with the hinge pin opening 34 of hinge boss 31 of platform 15, and hinge pin 18 is inserted through the aligned openings and pivotably connects support plate 16 to platform 15. The inner surfaces 56 and 57 of hinge bosses 50 and 51 face the front edge 32 of platform 15 and are angled slightly with respect to the vertical so that there is a small gap 58 formed between the inner surfaces 56 and 57 and the respective surfaces of the front edge 32 of the platform. This permits the support plate 16 to be pivoted upwardly through a small angle as indicated by the dash lines at the left of FIG. 3, so as to move the flat bottom surface 44 of support plate 16 away from the flat platform surface 24 of platform 15. The hinge pin openings 54 and 55 are over-sized so that the support plate 16 is vertically movable with respect to platform 15, which permits the flat bottom surface 44 of support plate 16 to rest flat against strap 14, with the strap 14 resting flat against the flat platform surface 24. With this arrangement, both of the opposite surfaces of the strap 14 will be in flat engagement with the platform 15 and support plate 16 and no load is supported by hinge pin 18.

The top surface 47 of support plate 16 includes a rectangular recess 60, and a rectangular support pad 61 which corresponds in length and width to the recess 60 is inserted in the recess. Support pad 61 is of a thickness greater than the depth of recess 60 so that its upwardly facing surface is located higher than the top surface 47 of support plate 16. Support pad 61 is fabricated from a material suitable for engaging the external surface of a cylindrical roll, or the like 64. For example, materials from which the support pad can be fabricated are Teflon, Nylon, Neoprene or rubber.

Strap 14 is fabricated from a single length of woven Nylon, Dacron or other relatively non-stretchable material, and its end portions 65 and 66 extend between the platform and support plate of the support blocks 11 and 12. The ends 67 and 68 are enlarged, as by folding the strap over on itself and stitching through the strap, and the enlarged ends are of a thickness greater than the space that can be formed between the platforms 15 and their support plates 16, so that the ends of the strap 14 cannot be inadvertently pulled out of the support blocks 11 and 12. Indicia 70 are imprinted on the support strap 14 (FIGS. 1 and 2), with the indicia being spaced apart a prescribed distance to indicate length dimensions along the support strap. For example, the indicia in the embodiment disclosed herein are at one inch intervals, with certain ones of the indicia being enlarged to indicate six inch intervals. The distance between the support blocks 11 and 12 can be visually determined by noting the number of indicia 70 that are exposed on the strap between the support blocks.

When the support block assembly 10 is to be used to support a cylindrical roll 64, a pair of the support block assemblies are used, one at each end of the cylindrical roll. The support blocks 11 and 12 are spread apart (FIG. 3) with their flat bottom surfaces 20 in flat engagement with the floor surface, and with the strap 14 extending therebetween. The support blocks are positioned along the length of strap 14 so as to expose the prescribed length of strap 14, as indicated by the exposed indicia 70 between the support blocks, so that the support blocks are properly spaced apart for the size of the cylindrical roll 64 that is to be supported. The operator can grasp the handle 40 of a support block and pull on the enlarged end 67 of the support strap to move the support block closer to the opposite support block and to pull the strap between the platform 15 and the support plate 16 of the support block. If necessary, the operator can lift the support plate 16 away from the platform 15 to relieve the pressure applied to the strap 14 while manipulating the strap.

When the cylindrical roll 64 is lowered onto a pair of the support block assemblies 10, the downward force applied by the cylindrical roll 64 tends to urge the support plate 16 against the strap 14, with the strap being urged against the platform 15, thereby securely clamping the strap in the support blocks. This prevents the support blocks from moving away from each other. The wedge shape of the support plate 16 of each support block tends to prevent the cylindrical roll 64 from rolling in an upward direction over the support block, and since the support blocks are oriented so that their support pads 61 are inclined downwardly toward the opposite support block, the cylindrical roll 64 is securely cradled by the support blocks in a static position. Moreover, if the support blocks are properly spaced apart from each other, the cylindrical roll 64 will not engage the floor surface.

When the support block assembly 10 is to be moved from one location to another, the worker simply lifts the strap 14 at an intermediate position between the support blocks 11 and 12, and the support blocks assume a carry position as indicated in FIG. 4, with the flat bottom surfaces 20 of the support blocks being carried in parallel juxtaposition. When the support block assembly is to be lowered to the floor surface for storage, the end surfaces 29 of the upstanding ears 26 and 27 engage the floor surface and orient the support blocks so that their flat bottom surfaces 20 are upright and approximately in a parallel facing attitude. Since the enlargements 67 and 68 at the ends of the strap 14 are larger than the gap that can be formed between the support plates 16 and platforms 15, the flexible strap functions as a carrying sling and connects together the support blocks.

The top surface 47 of support plate 16 of support block 11 is angled with respect to its flat bottom surface 44 at approximately 15°. Thus, the upwardly facing support surface 62 of support pad 61 is usually oriented at a 15° angle with respect to the floor surface upon which the support block assembly is resting. Likewise, the upwardly facing support surface 62 of the opposite surface block 12 is oriented at a 15° angle with respect to the horizontal. The particular angle of inclination of the support surfaces causes a large portion of the weight of the cylindrical roll 64 to be applied to the support blocks 11 and 12 at a near vertical angle, and the relatively small horizontal vector applied to the cylindrical roll 64 by the sloped supporting surfaces assures that the cylindrical roll will not move off the cradle formed by the support block assembly.

The support blocks 11 and 12 are fabricated from cast aluminum; however, various other materials can be used to form the support blocks, such as plastic or steel.

While this invention has been described in detail with particular reference to a preferred embodiment therof, it will be understood that variations and modifications can be effected within the spirit and scope of the invention as described hereinbefore and as defined in the appended claims.

We claim:

1. A support block assembly for cylindrical rolls and the like comprising a pair of support blocks of similar construction, each said support block including a platform for engaging a floor surface, a support plate positioned on said platform, and a strap extending between each said support block, with one end portion of said strap extending between the support plate and the platform of one support block and the other end portion of said strap extending between the support plate and the platform of the other support block, hinge means hingedly connecting together the platform and support plate of each support block in such a manner the weight of the support plate is supported by the platform and the strap is compressed between the support plate and the platform and said support plates each including an upwardly facing support surface sloped downwardly toward the opposite support block, whereby when a cylindrical roll or the like is placed on the support blocks the support surfaces of the support blocks are engaged by the cylindrical rolls and form wedges that support the roll.

2. The support block assembly of claim 1 and wherein said strap includes marks along its length which indicate length dimensions of said strap whereby the distance of one support block from the other can be measured by observing the marks of the strap exposed between the support blocks.

3. The support block assembly of claim 1 and wherein said hinge means comprises a loose fit between said support plate and said platform and is constructed such that said hinge means does not bear the load applied by the support plate to the platform.

4. The support block assembly of claim 1 and wherein said strap is flexible and is slidably received in said support blocks and extends through both said support blocks and wherein said strap includes protrusions at its ends of a size great enough not to move between the platform and support plate of each support block, whereby the support blocks are connected together by the strap.

5. The support block assembly of claim 1 and wherein the platform of each said support block includes a substantially flat bottom surface for engaging a floor surface, said hinge means of each said support block is positioned at one end of the platform and adjacent the other support block, and a side surface is formed at the other end of the platform extending substantially at a right angle with respect to the bottom surface of said platform, whereby the strap can be lifted at a position intermediate its end portions and the pair of support blocks will be suspended by the strap with their bottom surfaces juxtaposed, and the support blocks can rest with their side surfaces engaging a floor surface and their bottom surfaces juxtaposed.

6. The support block assembly of claim 1 and wherein the support plate of each said support block includes an upwardly facing recess, and a pad of a shape corresponding to said recess received in said recess and protruding upwardly above said support block for engaging and supporting a cylindrical roll or the like.

7. A support assembly for cylindrical rolls and the like comprising a pair of support blocks of similar construction, each said support block including a lower portion for resting on a floor surface and an upper portion supported by said lower portion, said lower portion and upper portion being movable vertically toward and away from each other to form a space therebetween, strap means extending between each said support block with one end portion of said strap means extending through the space between the lower portion and the upper portion of one support block and the other end portion of said strap means extending through the space between the lower portion and the upper portion of the other support block, and the upper portion of each support block including an upwardly facing support surface sloped downwardly toward the opposite support block, whereby when a cylindrical roll or the like is placed on the support block assembly the upwardly facing support surfaces are engaged by the cylindrical roll and form wedges that support the roll and the weight of the cylindrical roll is transmitted through the upper portion of each support block toward the strap means and the lower portion of the support block to compress the strap means between the upper and lower portions of the support block.

8. The support block assembly of claim 7 and wherein said strap means comprises an elongated, flat strap with a protrusion on at least one of its ends of a size great enough not to move through the space between the lower portion and the upper portion of the support blocks.

* * * * *